Jan. 12, 1954    R. W. KING ET AL    2,665,620
ROLL-FILM CAMERA INCORPORATING A ROTATABLE BACK
Original Filed Sept. 12, 1945    4 Sheets-Sheet 1

*INVENTOR.*
ROLLIN W. KING
EMMANUEL BERLANT
BY

ATTORNEYS

INVENTOR.
ROLLIN W. KING
EMMANUEL BERLANT
BY
ATTORNEYS

Jan. 12, 1954   R. W. KING ET AL   2,665,620
ROLL-FILM CAMERA INCORPORATING A ROTATABLE BACK
Original Filed Sept. 12, 1945   4 Sheets-Sheet 4
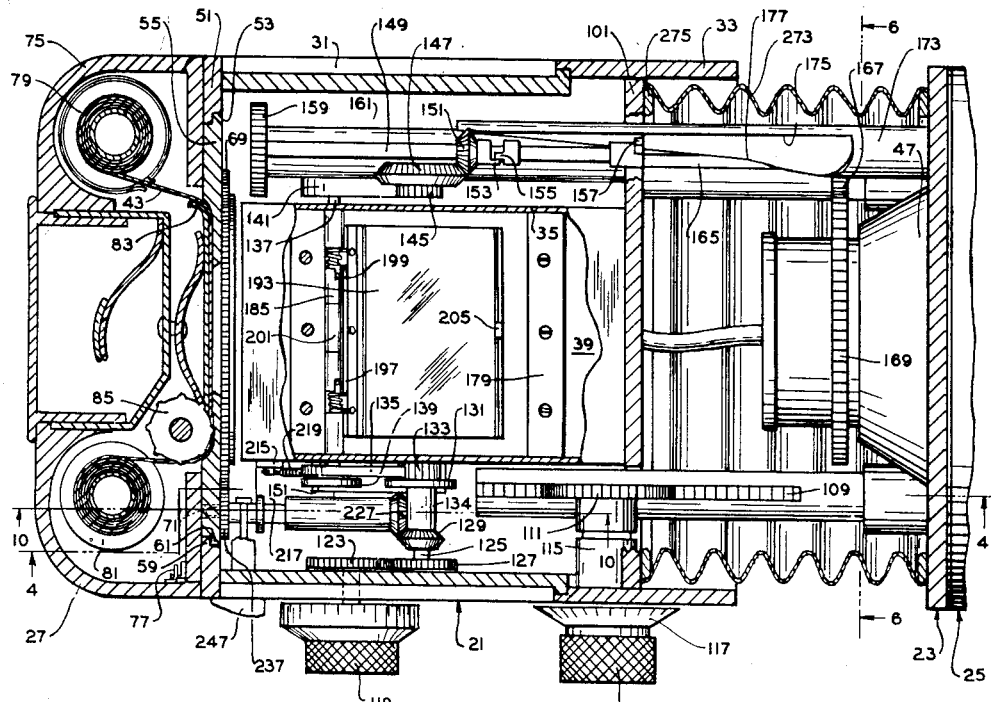
FIG. 5.
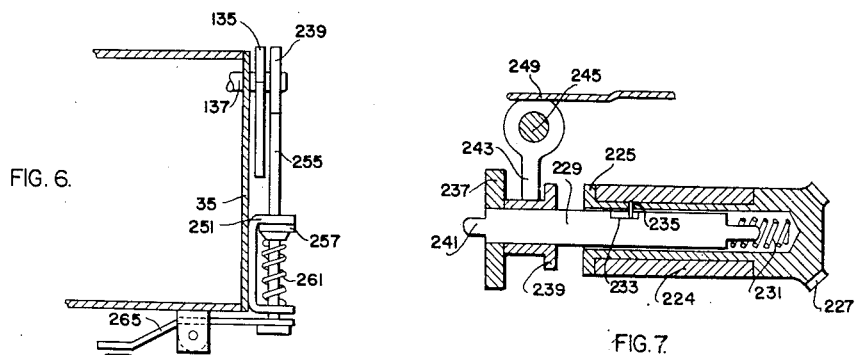
FIG. 6.
FIG. 7.
INVENTOR.
ROLLIN  W. KING
BY EMMANUEL BERLANT
ATTORNEYS

Patented Jan. 12, 1954

2,665,620

UNITED STATES PATENT OFFICE 2,665,620

ROLL-FILM CAMERA INCORPORATING A ROTATABLE BACK

Rollin W. King, Berkeley, and Emmanuel Berlant, Culver City, Calif., assignors, by mesne assignments, to Graflex, Inc., Rochester, N. Y., a corporation of Delaware Original application September 12, 1945, Serial No. 615,906, now Patent No. 2,550,698, dated May 1, 1951. Divided and this application July 12, 1950, Serial No. 173,396

27 Claims. (Cl. 95—31)

1

The invention described herein may be manufactured and used by and for governmental purposes without the payment to us of any royalty thereon.

This application is a division of our co-pending application Ser. No. 615,906, filed Sepetember 12, 1945, now Patent No. 2,550,698, dated May 1, 1951.

This present invention relates to roll film cameras incorporating a rotatable back.

In order that the principle of the invention may be readily understood, we have disclosed a single embodiment thereof in the accompanying drawings, wherein—

Fig. 5 is a horizontal sectional view, taken along the line 5—5 of Fig. 4;

Fig. 6 is a fragmentary, vertical, sectional view, taken along the line 6—6 of Fig. 4, showing details of the trigger mechanism; and Fig. 7 is a fragmentary cross-sectional view, taken along the line 7—7 of Fig. 5, showing details of the release mechanism for the rotating back.

Figure 1:
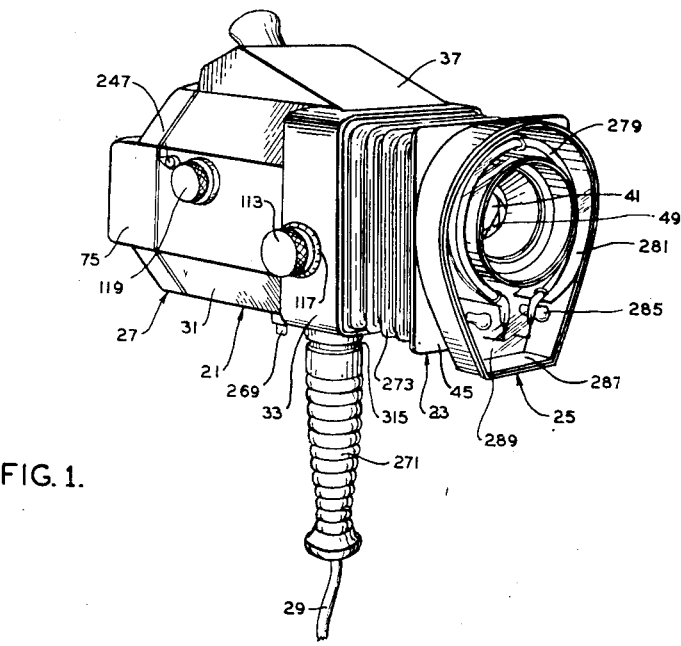
Fig. 1 is a front perspective view of a camera embodying the present invention, the bellows being shown extended about half way.

Most cameras are relatively slow in operation and are subject to poor results because of errors in making the necessary and sometimes critical adjustments, and also it is ordinarily requisite, for good results, that they be operated by fairly experienced photographers. Various means, such as light meters, self-incorporated coupled range finders, and the like, which aid in reducing errors and in speeding up the process, have been introduced to the photographic art, but so far as is known to applicants, there is no camera suitable for general use which requires but a single adjustment (other than moving the film to the next frame) and in which the results are invariably good, even in the hands of neophytes in the art of photography. The present invention, however,

2 provides a camera which does just that. The several factors which are ordinarily variables, are made constant or are predetermined and made automatic, so that the only adjustment is the relatively simple one of focusing, preferably as in a reflex camera.

The means for accomplishing most of the objects of the entire invention to which the said parent application Ser. No. 615,906 is directed are claimed therein. The object of the invention to which this divisional application is particularly directed is to eliminate the necessity for ever holding the camera sideways by providing a rotating or rotatable back which will allow the use of roll film, either horizontally or vertically, or even obliquely if desired, without interfering with the film transport mechanism, such back comprising essentially a rotatable plate-like member having an exposure opening therein, and film supporting means. That is to say, the important thing is that the photographer can take either vertical or horizontal pictures by rotating the back. In other words, pictures can be taken in different positions without changing the position of the body portion of the camera. This is of greater importance than the fact that pictures in different positions can be taken upon the same film at different exposure areas of the film, which is also a fact and may be of great convenience upon some occasions.

In order, however, that the entire operation of the camera may be sufficiently understood, we shall herein describe the general structure of the camera and its features and the operation thereof as disclosed in said parent application Ser. No. 615,906, presenting one embodiment only of the invention.

The camera is one in which the only needed adjustment is focusing. It incorporates its own light source. It provides means which allow the focusing of a camera with its diaphragm wide open, so as to obtain brightest illumination and shallowest depth of focus, but which automatically determine the correct diaphragm stop for taking a particular picture and then close the diaphragm to said stop upon the triggering of the camera.

It provides a light source in the form of a compact circular tube disposed concentrically with the lens of a camera. It provides shutter means for a reflex type of camera, which means are associated with the reflex mirror, whereby closing of the shutter may be effected more rapidly than could be accomplished by using the mirror itself as a shutter.

The camera that is herein disclosed in one that comprises a still camera, preferably of the reflex type, which incorporates its own light source, preferably in the form of a circular gaseous tube disposed concentrically with the camera lens, which provides a light of great intensity but very short duration; a shutter means which opens before and closes after the flash of the said light source, and which is preferably in the form of a shutter plate, which pivots about the same axis as the reflex mirror, but which returns to its closed position, separately from the mirror, immediately after the light flash; a focusing and diaphragm setting mechanism whereby the operation of focusing the camera, which is accomplished with the diaphragm wide open, also automatically effects the positioning of a cam so that, upon triggering the camera for taking a picture, a cam follower cooperates with said cam to allow the diaphragm to be automatically closed down to the correct stop; and a rotating back or back member, which houses roll film, which back or back member may be rotated so that pictures may be taken vertically or horizontally, the back or back member being so arranged that the film may be transported to the next frame at any operating position of the said rotating back or back member and pictures can be taken in different positions without changing the position of the body portion of the camera.

In the embodiment hereinafter described, it will be seen that, as the light source produces a flash of great brilliance and very short duration and as the intensity and duration thereof are constant, the only adjustments which need be made are focusing for the distance between the camera and the subject and adjusting the diaphragm opening to such distance. Adjustment of the diaphragm is necessary as the amount of light reaching the subject from the light source, which is located at the camera, will likewise depend upon the distance between the camera and the subject. As, under the circumstances, the proper relationship between focus and diaphragm opening may be predetermined, the diaphragm adjustment may be automatically effected concomitantly with the focusing operation, by the use of a suitably shaped cam and cam follower. However, in order to facilitate focusing, although the said cam is positioned simultaneously with focusing, the diaphragm itself is left wide open (to provide a maximum amount of light and a minimum depth of focus) until the camera is triggered for the taking of a picture. At that time, the diaphragm closes down until the cam follower, which is geared to it, makes contact with the cam, which has already been suitably positioned during focusing, whereupon the flash occurs and the film is exposed. Thus, in order to take a picture, focusing is the only adjustment that need be made.

Although in the illustration hereinafter described, the present invention is applied to a particular type of camera, it will be understood that the invention, or certain features of it, may be applied to other types of photographic equipment, as will be apparent to persons familiar with the photographic art.

For a better understanding of the invention, together with other and further objects thereof, reference is had to the following description taken in connection with the accompanying drawings, wherein like parts are indicated by like reference numerals, and its scope will be pointed out in the appended claims.

Figure 2:
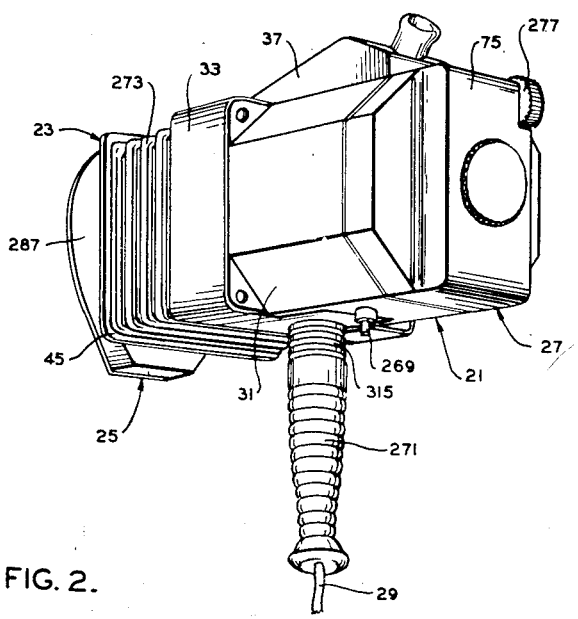
Fig. 2 is a rear perspective view of the camera of Fig. 1.
Figure 3:
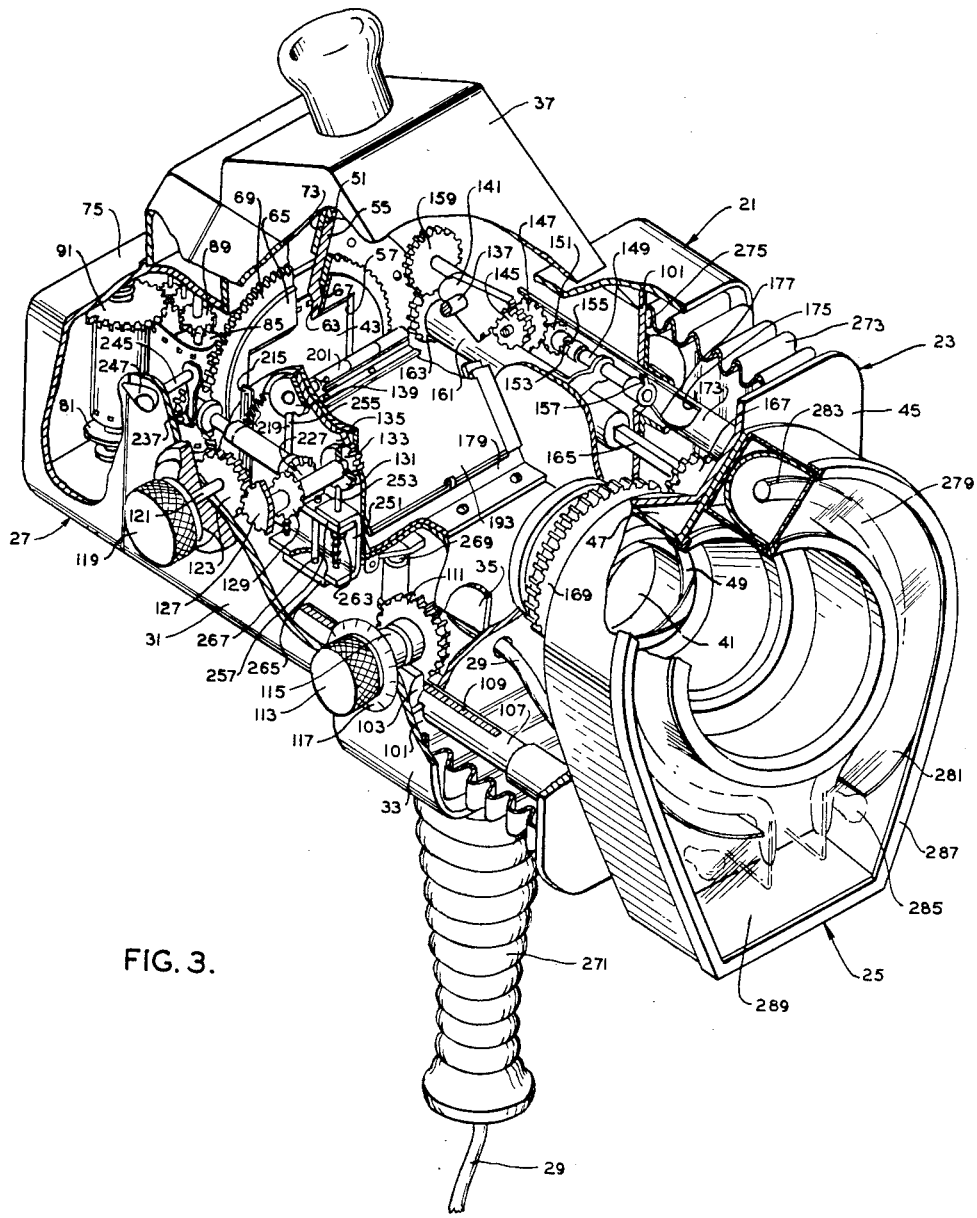
Fig. 3 is an enlarged perspective view, similar to Fig. 1, parts of the camera being shown broken away to expose the interior, the parts being illustrated in their relative positions during the focusing of the camera.

Referring now to the drawings, and more particularly to Figs. 1, 2 and 3 thereof, the camera illustrated includes as its main structural components a body assembly 21, a lens assembly 23 which is positioned at the forward end of said body assembly 21 and is longitudinally movable relative thereto, a flash unit 25 which is rigidly secured to the front of the lens assembly 23 and moves with it, and a rotating back 27 which is positioned at the rear end of the body assembly 21 and is rotatable with respect thereto. The camera is used with a power pack (not shown) which is connected to the camera by means of a multiple conductor electrical cable 29.

The body assembly 21 includes a camera body 31 which is octagonal in vertical cross section, and a camera frame 33 which is of substantially square configuration, which is rigidly secured thereto, and an inner housing 35 which is square in vertical cross section and is coaxially disposed within and spaced from said camera body 31 and camera frame 33. The top of the camera body 31 is provided with a viewer housing 37.

As will appear hereinafter, said inner housing 35 encloses a photographic chamber 39 which is provided with a lens 41 at one end and a photographic film 43 at the other, and the various mechanisms for operating the camera are positioned largely in the space between said inner housing 35 and said body 31 and frame 33.

The lens assembly 23 comprises a flat lens board 45 of substantially square outer configuration, which is provided with a central circular opening in which is secured a rearwardly directed funnel-like lens ring 47 which supports the lens 41 provided with a conventional iris-type diaphragm 49.

We will next describe the single disclosed embodiment of rotatable back or back member to which embodiment, however, our invention is not limited.

The rear end of the camera body 31 terminates in a vertically disposed rear wall 51 which is provided with a large circular aperture, the inner marginal edge of which forms a bearing surface 53, Fig. 5. Rotatably positioned within said bearing surface 53 is an aperture plate 55 which is pierced centrally by an oblong frame opening 57. In order to retain said aperture plate 55 properly positioned in the bearing surface 53, said bearing surface 53 is provided with an inwardly projecting annular flange 59, Fig. 5, and the outer periphery of the aperture plate 55 with an outwardly extending annular flange 61, the flange 61 being positioned forward of the flange 59.

Said aperture plate 55 is also provided with a forwardly extending annular bearing flange 63, to which is secured a washer-like plate 65, the outer periphery of which is of greater diameter than the outer periphery of the bearing flange 63 so that there is formed, between the aperture plate 55 and the washer-like plate 65, a bearing channel 67, Fig. 3, which encircles said flange 63. Positioned in said bearing channel 67 is a freely rotatable ring gear 69 which is merely a flat metal ring provided with spur gear teeth about its outer periphery. The aperture plate 55 aforesaid is also pierced near its outer periphery by two small indexing holes 71, which are positioned in quadrature, that is, 90° apart, as subsequently referred to more fully.

Secured to the aperture plate 55 and positioned directly behind the rear wall 51 of the camera body 31 is the rotating back 27 which includes a centrally apertured rotation plate 73 and a film housing 75 hingeably secured at one edge to the rotation plate 73 and provided with a catch 77 at the opposite edge. When closed the rotation plate 73 and film housing 75 form a lightproof unit provided with two mutually parallel cavities receivable to a film cartridge 79 and a take-up spool 81.

Secured within the film housing 75 is a vertically disposed C-shaped pressure plate 83. Rotatably positioned behind the right end of the pressure plate 83, and parallel to the take-up spool 81, is a sprocket spool 85. Secured to one end of the sprocket spool 85 is a sprocket drive bevel gear 87 and to the other end thereof is a sprocket spool spur gear 89. Said spur gear 89 is geared, through a pair of spur gears, to a take-up spur gear 91 which is coupled to the take-up spool 81 through a friction plate 93, to avoid undue strain on the film 43.

The sprocket drive bevel gear 87, just mentioned, is in mesh with a sprocket driver bevel gear 95 secured to the rear end of a short, horizontally disposed, shaft 97, which extends forward through a bearing in the aperture spur gear 99 which is in mesh with the ring gear 69, aforementioned.

Secured within the camera frame 33 is a vertically disposed front wall 101 and immediately behind it are two bearings 103 which slidably support a horizontally disposed guide shaft 105 and a horizontally disposed drive shaft 107, the forward ends of which shafts 105, 107 are rigidly secured to the lens board 45, thereby allowing the lens assembly 23 to move longitudinally relative to the body assembly 21.

The upper surface of the drive shaft 107 is provided with a countersunk rack 109 (see particularly Fig. 3). A focusing pinion 111, in mesh with said rack 109, is rotatable by means of a focusing knob 113 positioned outside the camera on the right side of the camera frame 33. Said focusing pinion 111 and focusing knob 113 are preferably coupled through a friction clutch 115, so that undue pressure may not be transmitted to said pinion 111 (and ultimately to the cam and cam follower, as will hereinafter appear). Rigidly secured to said focusing pinion 111 and positioned outside the camera, concentric with the focusing knob 113, is a circular distance scale 117.

Positioned on the right side of the camera body 31, to the rear of the focusing knob 113, is a reset knob 119, constituting an operating handle and which is so termed in certain of the claims. Said reset knob 119 is made fast to the outer end of a reset shaft 121 which extends through the camera body 31 and terminates in a reset spur gear 123. Disposed in suitable bearings a short distance forward of reset shaft 121 is a power transmitting shaft 125, to which are rigidly secured a power transmitting spur gear 127 (in mesh with the aforementioned reset gear 123, and having one gear tooth less than said gear 123), a film drive bevel gear 129, a film advance locking cam 131 (which is a vertically disposed disk provided with an indentation at one point of its periphery), and a shutter setting spur gear 133 (which is toothless throughout a small portion of its periphery). A conventional type one-way brake 134 encircles said shaft 125. Said brake may comprise a spring (not shown) wound snugly about said shaft 125 and anchored at one end and a sleeve surrounding said spring.

Said shutter setting gear 133 is meshable with a mirror actuating gear segment 135, which is rigidly fastened to a mirror-shutter shaft 137 which extends horizontally completely through both side walls of the inner housing 35. Rigidly secured to the right end of said mirror-shutter shaft 137 is a mirror holding cam 139, which is a vertically disposed disk provided with an indentation at one portion of its periphery, said indentation, however, being wider than the indentation in the cam 131, aforementioned.

A diaphragm opening spur gear segment 141 is rigidly secured to the left end of said mirror-shutter shaft 137, extending beyond the left wall of the inner housing 35. A short distance forward of the mirror-shutter shaft 137, parallel thereto, and positioned to the left of the inner housing 35, is a short, suitably sustained, non-rotatable intermediate shaft 143, which is provided with an idler spur gear 145 and an idler bevel gear 147. Said gears 145, 147 are freely rotatable as a unit upon the said shaft 143, and the said spur gear 145 is in mesh with the gear segment 141, aforementioned.

To the left of the inner housing 31 is a longitudinally positioned, diaphragm control shaft 149, which is rotatably supported in suitable bearings, and is provided with a diaphragm opening bevel gear 151, which is in mesh with the bevel gear 147 aforesaid and is freely rotatable upon said shaft 149. Said bevel gear 151 has secured to it a longitudinally extending, diaphragm opening finger 153. The shaft 149 is also provided with a longitudinally disposed finger 155, which cooperates with the said finger 153. Rigidly fastened to the forward end of the diaphragm control shaft 149 is a cam follower 157, which is a radially disposed dog. A cam follower spur gear 159 is fastened to the shaft 149 near its rear end.

Below the shaft 49 and parallel to it is a rotatable circular sleeve 161 provided with a longitudinal bore of square configuration. A spur gear 163, in mesh with the spur gear 159 mentioned above, is made fast to the rear end of said sleeve 161. Longitudinally slidably positioned in the bore of said sleeve 161 is a square rod 165 upon which is mounted a spur gear 167 which is in mesh with a diaphragm spur gear 169 which is secured to, and concentric with, the conventional iris diaphragm 49.

A cam 173, Fig. 3, is rigidly secured to the lens board 45 and extends backward longitudinally therefrom, the front wall 101 being provided with a circular aperture through which said cam 173 is free to slide. The cam 173 is preferably cut from a metal tube, and it is provided with a longitudinally disposed straight edge 175.

As stated above, the mirror-shutter shaft 137 extends completely across the photographic chamber 39, near the top of said chamber (see particularly Figs. 2 and 3). Immediately below said shaft, is a baffle plate 179 which extends downward, toward the front of the camera, at a forty-five degree incline. Said baffle plate 179 makes a lightproof fit with the interior of the inner housing 35 and is provided with a large central rectangular opening 181. The upper surface of said baffle plate 179 about said opening 181 is covered with a frame-like shutter gasket 183 of felt or similar resilient material.

Hingeably attached by sleeves to the mirror-shutter shaft 137 is a flat rectangular metal mirror plate 187. A mirror 193 is fastened to the upper surface of said mirror plate 187. A spring plate 195 is secured to the proximal end of said mirror plate. The mirror plate 187 will rotate with the shaft 137 in both directions of rotation. Positioned below the mirror plate 187 and also pivotally secured to the mirror-shutter shaft 137 is a flat metal shutter plate 203 which is provided at its digital extremity with an upwardly extending contact arm 205.

Figure 4:
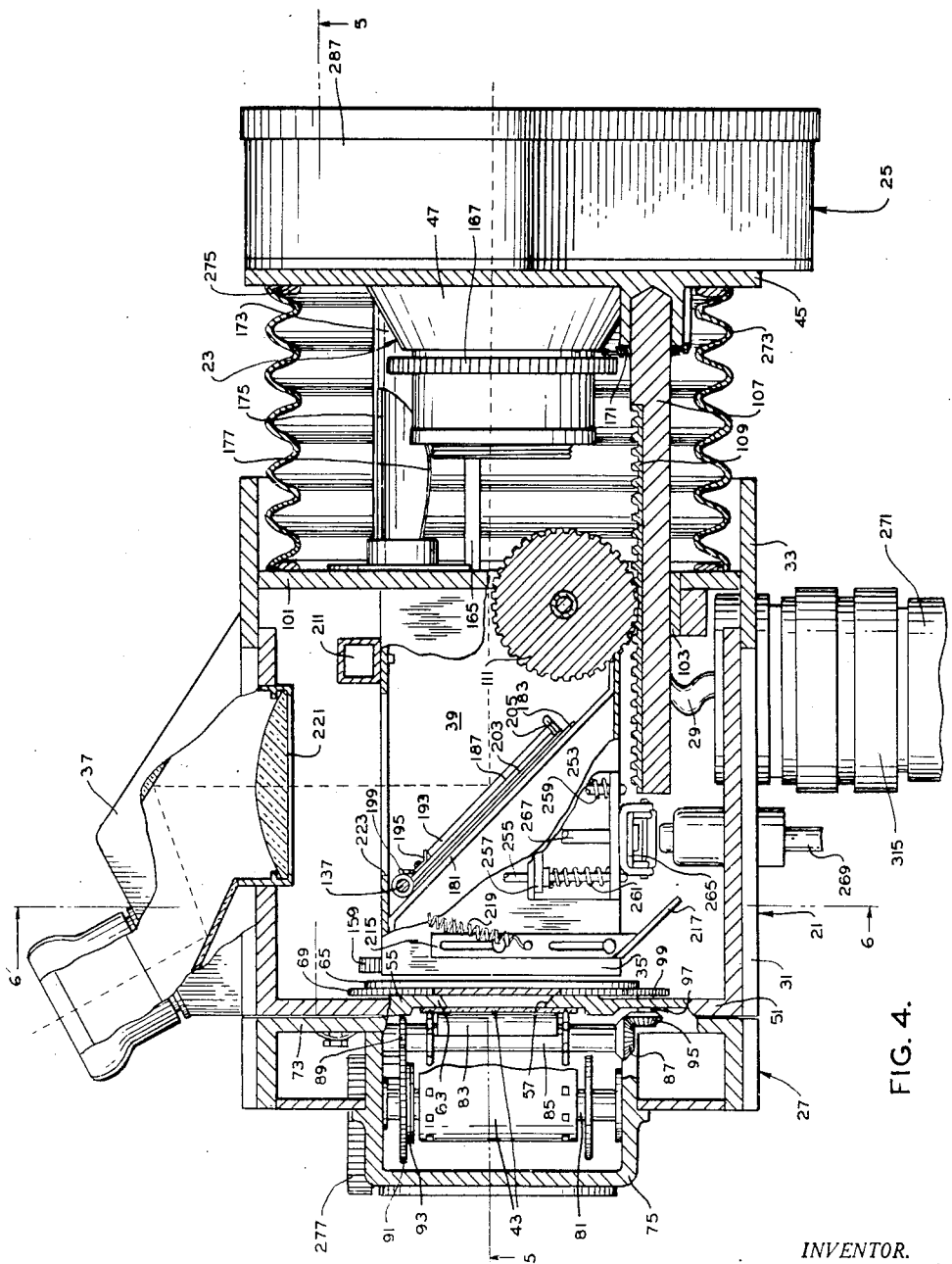
Fig. 4 is a longitudinal vertical sectional view, taken along the line 4—4 of Fig. 5.

The said mirror plate 203, when in its downward position (as shown in Figs. 3 and 4) makes a light tight fit against the shutter gasket 183 of resilient material mentioned above, and when in its upward position the contact arm 205 closes an electrical switch 211 (Fig. 4). Said switch 211 (which may be any suitable electrical single-pole single-throw switch) is secured to the top wall of the inner housing 35 and will be referred to hereinafter in connection with the flash unit 25.

A tension adjusting plate 215 (see Fig. 4) provided with vertically disposed slots, is fastened to the right wall of the inner housing 35 so as to be free to slide vertically. An obliquely disposed shoe 217 is attached to the lower end of said plate 215. A helical, mirror return spring 219 connects said plate 215 and the mirror actuating gear segment 135. The said shoe 217 is so positioned directly behind the drive shaft 107 that, when the said shaft is moved backward, its rear end engages said shoe and causes the plate 215 to slide downwardly, thereby increasing the tension upon the mirror return spring 219, as will be made clearer hereinafter.

The viewer housing 37, already referred to, extends upward from the camera body 31. It houses a suitable viewer optical system, preferably of magnifying type, including a ground glass 221. The upper wall of the inner housing 35 is provided with a rectangular aperture 223 immediately below said ground glass 221.

Positioned in a suitable bearing 224, to the right of the inner housing 35, is a freely rotatable hollow sleeve 225 (see particularly Figs. 3 and 7) provided at its forward end with a film transport bevel gear 227, which is in mesh with the film drive bevel gear 129, already described. A retractable shaft 229 is positioned in the hollow sleeve 225 aforesaid and is urged toward the back of the camera by a helical spring 231 disposed within said sleeve. Said shaft 229 is provided with a longitudinally disposed slot 233 into which extends a pin 235 which is rigidly secured to the inside of said sleeve 225, so that said shaft and sleeve rotate as a unit, but the shaft may be slid forward longitudinally a limited distance against the pressure of the spring 231.

Secured to the rear end of the retractable shaft 229 is a film transport spur gear 237 in mesh with the ring gear 69, already described. Also secured to said shaft 229 and spaced from said spur gear 237 is a radially disposed flange 239. Extending backward beyond said spur gear 237 and concentric therewith is a short pin 241 adapted to extend into either one of the two indexing holes 71, previously referred to, in the aperture plate 55.

Extending downward, intermediate the spur gear 237 and the flange 239, is a retracting arm 243 which is rigidly fastened to the inner end of a short retracting bar 245 which extends through a bearing set into the right wall of the camera body 31. Said bar 245 terminates outside said camera body 31 in a retracting knob 247, Figs. 1, 3 and 5. The upper surface of the retracting arm 243 is flat and a leaf spring 249 presses against said flat surface so that, during normal operation, said retracting arm does not interfere with the operation of the film transport mechanism. However, upon rotating the retracting knob 247 counter-clockwise, the arm 243 presses against the flange 239, and thereby disengages the spur gear 237 from the ring gear 69. Upon release of said retracting knob 247, the spring 231 causes re-engagement thereof.

A U-shaped yoke 251 is fastened to the right wall of the inner housing 35 immediately below the cams 131 and 139. Extending vertically through both arms of the said yoke 251 are a film advance locking pin 253 (adapted to cooperate with the film advance locking cam 131) and a mirror holding pin 255 (adapted to cooperate with the mirror holding cam 139). Said pins 253, 255 also pass through holes in a trigger plate 257 which is horizontally disposed immediately below the upper arm of the yoke 251. Interposed between the lower arm of the yoke 251 and the said trigger plate 257 and encircling the two pins 253, 255 respectively, are helical springs 259, 261. The mirror holding pin 255 is rigidly fastened to the trigger plate 257 so that the two members move as a unit. A flange 263 is rigidly secured to the film advance locking pin 255 immediately below the trigger plate 257 which serves to hold the lock pin 253 out of engagement with the indentation in the cam 131 until the mirror is again reset by turning the knob 119, and the pin 255 engages the indentation in the cam 239, allowing the plate 257 to move in an upward direction because of the springs 259, 261. This will allow the lock pin 253 to engage the indentation in the cam 131, thus preventing further turning of the knob 119.

Pivotally secured to the bottom of the inner housing 35 is a trigger lever 265 (Fig. 6), the right end (as viewed from the rear of the camera) of which is normally positioned immediately below the yoke 251 aforesaid and is coupled to the trigger plate 257 by a pull-down rod 267 which extends through a hole in the lower arm of the said yoke 251. The left end of the trigger lever 265 is normally below and spaced from the bottom of the inner housing 35. Immediately below said left end and extending through a hole in the bottom of the camera body is a trigger 269 which is vertically slidable, but is normally maintained in a downward position by gravity by a trigger spring (not shown).

Extending downwardly from the bottom of the body assembly 21 is a camera handle 271, which is positioned immediately forward of the trigger 269 so that an operator can conveniently hold the camera in his left hand by means of said handle, and press the trigger upwardly with his thumb. The multiple conductor electrical cable 29, which connects the flash unit 25 with a power pack (not shown) extends through said handle 271.

A bellows 273 of leather or the like is secured to the front plate 101 and the lens board 45 by means of bellows frames 275. The rotating back 27 is provided with a conventionally operating rewind knob 277 (Figs. 2 and 4) to return the film 43 to the film cartridge 79 after a roll has been exposed.

The flash unit 25, which is rigidly secured to the lens board 45 aforementioned, includes a gaseous type, elongated flash tube 279, which is bent into as small a circle as possible, concentric with the camera lens 41. Said tube 279 is suitably sustained in front of a circular reflector 281. Secured along the outside of the tube 279 is an ionizing electrode 283. Below the reflector are a pair of small focusing bulbs 285 of the flashlight type. Said tube 279 and bulbs 285 are housed in a suitable flash case 287 having a transparent front wall 289 and provided with a circular central opening directly in front of the lens 41.

The operation of the camera just described is as follows: To load, the film housing 75 may be swung back about its hinge, upon release of the catch 77, and a film cartridge 79 is positioned in the cavity provided for it, the film 43 being then first threaded between the pressure plate 83 and the aperture plate 55, then about the sprocket wheel 85 and finally onto the take-up spool 81. The film housing 75 is then closed and the reset knob 119 is rotated and the trigger 269 actuated several times to move unexposed film into position. To take a photograph, the line switch is closed and the reset knob 119 is rotated in a clockwise direction until it locks. Focusing is then accomplished by the focusing knob 113 whereupon the picture may be taken by viewing the subject through the viewer and pressing the trigger 269 upward with the thumb.

More specifically, said operative steps are effectuated as follows: After the camera has been triggered, the mirror plate 187 and the mirror 193 are left in their upward positions, against the top wall of the inner housing 35 and the shutter plate 203 is left in its downward position against the shutter gasket 183. When the reset knob 119 is rotated in a clockwise direction, it rotates the spur gear 123, which in turn rotates the spur gear 127, the shaft 125, the bevel gear 129, the cam 131 and the gear 133. As said gear 133 first starts to rotate, it is out of mesh with gear segment 135 as the toothless portion of its periphery is facing said gear segment. However, as soon as it rotates a bit, it engages the said gear segment 135 and rotates it, which in turn rotates the mirror-shutter shaft 137, the cam 139 and the gear segment 141 and swings the mirror plate 187 and the mirror 193 downward.

When the mirror plate 187 is brought down until it is contiguous with the shutter plate 203, the cam reaches the position shown in Fig. 3, so that the upper end of the mirror holding pin 255 is urged upwardly into the indentation in said cam by the spring 261. At this instant, the indentation in the cam 131 has not yet reached the bottom of said cam so as to receive the film advance locking pin 253.

With further slight rotation of the reset knob 119, the cam 139 continues to turn and the pin 255 rides in the relatively wide indentation in said cam.

At this point, the indentation on cam 131 reaches the position at the bottom of said cam, whereupon the film advance locking pin 253 is urged upwardly into said indentation by the spring 259. At the same time, the spur gear 133 rotates to the point where its toothless periphery is presented to the gear segment 135. Said gear segment 135 is then free to rotate in a counterclockwise direction under the urge of the mirror return spring 219, until the cam 139 is again in the position shown in Fig. 3, whereupon the pin 255 prevents further rotation of said cam in said direction. This locking of the cam 139 likewise locks the mirror-shutter shaft 137, and the mirror plate 187 and the mirror 193, attached to it, against counterclockwise rotation.

The reset knob 119 cannot now be turned further in a clockwise direction as the film advance locking pin 253 is in the indentation in cam 131 and has locked further rotation thereof. The reset knob 119 can at no time be rotated in a counterclockwise direction because of the one-way brake mechanism 134. As gear 123 has one more gear tooth than gear 127, the dial under reset knob 119 may indicate the number of frames which have been exposed at any time.

As already stated, rotation of the reset knob 119 causes counterclockwise rotation of the film drive bevel gear 129. This results in rotation of film transport bevel gear 227 and film transport gear 237, which in turn rotates ring gear 69. As said ring gear 69 is also in mesh with the sprocket drive spur gear 99, said latter gear is thereby rotated and, along with it, the sprocket driver bevel gear 95 and sprocket drive bevel gear 87 which is in mesh with it. Thus, the sprocket spool 85 and the sprocket spool spur gear 89, attached to its upper end, are caused to rotate which, in turn, through two intermediate spur gears, causes rotation of take-up spur gear 91 on the take-up spool. Thus, the film 43 is transported to the next frame by means of the sprocket spool 85 and is taken up on the take-up spool 81, strain on the film 43 being avoided, however, by the friction plate 93, already described.

The camera is now ready for focusing. This is done while the operator is looking down at the ground glass 221. The lens 41 is moved longitudinally by rotating the focusing knob 113 which, through the friction clutch 115, rotates the focusing pinion 111, which moves the rack 109 and drive shaft 107 longitudinally, and thereby similarly moves the lens board 45 and the lens 41 until the sharpest image is seen in the ground glass 221. The lens is then positioned properly relative to the distance between the camera and the subject.

During such focusing, the cam 173, which is rigidly secured to the lens board 45, is also moved longitudinally so that, when focusing is completed, the said cam 173 is in a particular longitudinal position relative to the cam follower 157, although the latter is not then in engagement with said cam. Also, during the focusing operation, the square rod 165 is moved longitudinally in the sleeve 161.

Upon completion of the focusing, the camera is in condition to take a picture. The operator then presses on the trigger 269 while using the ground glass 221 as a view finder. Such upward movement of the trigger 269 raises the left end (as viewed from the rear of the camera—see Fig. 6) of the trigger lever 265 and depresses the right end thereof. This lowers the pull-down rod 267 and the trigger plate 257. The mirror holding pin 255, being integral with the said trigger plate 257, is therefore pulled downward simultaneously, and the film advance locking pin 253 is likewise simultaneously pulled downward as said trigger plate pulls the flange 263 and said pin 253 downward along with it. As soon as said pins 253, 255 have been lowered, the cams 131 and 139 are no longer prevented from rotation thereby. As the toothless portion of shutter setting spur gear 133 is presented to the mirror actuating gear segment 135, the latter is also free to rotate.

The tension of the mirror return spring 219, therefore, causes an immediate and rapid counterclockwise rotation of said gear segment 135 and the mirror-shutter shaft 137, thereby immediately raising the mirror plate 187 and mirror 193. The shutter plate 203 also immediately swings upwardly. Thus, the mirror plate 187, mirror 193 and shutter plate 203 swing upwardly as a unit until the contact arm 205 engages the electrical trigger switch 211. As the contact arm 205 is attached to the shutter plate 203, the latter is stopped suddenly, whereas the mirror plate 187 and mirror 193, having considerable inertia, continue upwardly a short additional distance until they reach their upward positions. This is sufficient to cause separation of the mirror plate 187 from the shutter plate 203, whereupon the shutter plate 203 is immediately snapped downwardly by the shutter springs until it impinges against the shutter gasket 183. The various parts are preferably so arranged that the film 43 has been exposed through the opening in the baffle plate 179 for a period of the order of a hundredth of a second.

As the contact arm 205 caused the closing of the electrical switch 211 when the shutter plate 203 was in its uppermost position, it is at this instant that the flash tube 279 emits a flash of tremendous brilliance, but very short duration, preferably of the order of a ten-thousandth of a second. Thus, the flash occurs while the shutter plate 203 is wide open.

However, before the flash occurs, and while the mirror plate 187, mirror 193 and shutter plate 203 are swinging toward their upward positions, the diaphragm 49 is closed down to its proper stop, which was automatically preset during focusing. Counterclockwise rotation of the finger 155 and the diaphragm control shaft 149, to which it is rigidly secured, likewise causes counterclockwise rotation of the cam follower 157 until the latter engages the cam surface 177 of the cam 173, whereupon further rotation of the cam follower 157, the shaft 149 and the finger 155 is prevented. Thus, rotation of the finger 155 will be stopped when the cam follower 157 strikes the cam surface 177, but the finger 153 may continue its counterclockwise rotation until the shutter plate 203 reaches its upward position, whereupon the flash described above occurs. However, when the flash does occur, the diaphragm 49 has already been closed down to its proper stop.

In Figs. 1 and 3, the rotating back 27 is shown positioned for a horizontal picture. In Fig. 2, however, it is positioned for a vertical picture. The back 27 may be rotated to either of said positions without in any way upsetting either the transport of the film 43, or the indication, on the outside of the camera, of the number of frames already exposed, or any other operation. It is accomplished merely by rotating the retracting knob 247 in a counterclockwise direction, which causes the lower end of the retracting arm 243, Fig. 7, to move the flange 239 forward against the pressure of the spring 231, Fig. 7. This moves the film transport spur gear 237 forward and out of engagement with the ring gear 69. It also retracts the pin 241 from the indexing hole 71 which is then in position behind it.

The entire rotating back 27 is then free to rotate through three hundred and sixty degrees, if desired. As a practical matter, however, the camera will probably only have two indexing holes 71 arranged ninety degrees apart, one for horizontal pictures and one for vertical pictures. Thus ordinarily, the rotating back 27 will merely be turned through ninety degrees. Release of the retracting knob 247 will then allow the pin 241 to drop into the other indexing hole 71, and the film transport spur gear 237 again to intermesh with the ring gear 69, but at a point on said ring gear 69 ninety degrees removed from the point at which said gear 237 was previously in mesh. The pin 241 and gear 237 will move back into operating position by themselves under the pressure of the helical spring 231, when the indexing hole 71 is aligned with the pin 241.

When the rotating back 27 is rotated, the aperture plate 55, which is fastened to the rotation plate 73, rotates along with the said back, and hence, when the back 27 is horizontally disposed, the frame opening 57 will also be horizontally disposed. Rotation of the rotating back 27 will also carry with it the shaft 97, which extends through the aperture plate 55, and likewise the sprocket driver spur gear 99 which is attached to said shaft 97. As said spur gear 99 is in mesh with ring gear 69, said ring gear will rotate along with the rotating back 27.

From the detailed description of the herein disclosed embodiment of rotatable back, it will be seen that rotatable film-holding means is mounted in a rotatable back which comprise a film carrier and an apertured plate with an exposure opening, that a gear drive operatively connects the operating or reset knob 119 and the film advancing means, which is mounted mainly in the body of the camera and partly in the rotatable back, that means is provided for connecting or disconnecting the rotatable back from the body of the camera, and that means is provided for connecting the drive gear to the film-advancing means which is disengaged during rotation of the back and re-engaged on completion of the back rotation.

The friction clutch 115 is a safety feature incorporated to avoid damage to the cam surface 177, in the event that the focusing knob 113 is rotated after taking a picture, but before the reset knob 119 has been rotated to move the cam follower 157 out of engagement with the cam surface 177.

It is to be noted that double exposures are prevented, during ordinary use of the camera embodiment just described, for the reason that the shutter plate 203 remains in its closed downward position and cannot be raised until the mirror plate 187 is moved downwardly. But while the mirror plate 187 is being moved downwardly, the film 43 is being transported simultaneously to the next frame, and hence before the shutter plate can be raised, unexposed film will be in place.

However, should it ever become necessary to retrigger the camera with the same frame of the film in place, there is a means for accomplishing it. This is done by holding the retracting knob 247 in its retracted position while the reset knob 119 is rotated in its usual way. This effects the various resetting operations, already described, except that the film 43 is not transported to the next frame, as the film transport spur gear 237 is held out of engagement with the ring gear 69.

Although the distance scale 117 will ordinarily be calibrated in distance, it may also be provided with a magnification scale. This would enable an operator to take pictures at a desired magnification by presetting the focusing knob 113 to such magnification and then varying the distance between the camera and the subject to obtain greatest clarity on the ground glass 221.

The rewind knob 277 is always in engagement with the spool in the film cartridge 79, and therefore rotates during operation of the reset knob 119, thereby at all times acting as a visual indication that the film transport mechanism is operating.

While there has been described what is at present considered a preferred embodiment of the present invention, it will be obvious to those skilled in the art that various changes and modifications may be made therein without departing from the invention, and it is therefore aimed in the appended claims to cover all such changes and modifications as fall within the true spirit and scope of the invention. Particularly may the shape and structure of the rotatable back be changed provided it supports or carries a film mounted upon spools, and provided the film drive is so disengageable as to permit the back to be turned relatively to the body of the camera to the desired extent, whether ninety degrees or more, without any disarrangement of the film feed, and to permit the re-engagement of the gearing, so that the film may be further fed.

We claim:

1. A reflex roll film camera having an operating handle upon the camera body for manual manipulation, a rotatable back, rotatable film holding means mounted in said rotatable back, film advancing means mounted partly in said camera body and partly in said rotatable back, and operatively connected to said film holding means to rotate the same to advance the film, movement-transmitting means operatively connecting said handle with the film advancing means, so that by movement of said handle the film advancing means operates to advance the film, gear means consisting of at least two normally directly inter-engaging motion-transmitting members that are disengageable from each other and constituting a part of the said motion-transmitting means operatively connecting said handle and said film advancing means, whereby movement of the operating handle advances the film advancing means, and means whereby such normally inter-engaging movement transmitting members of the gear means may be disengaged from each other prior to rotating the back and re-engaged after rotation.

2. A photographic camera of the roll-film type having a body assembly, a lens assembly at the forward end of the body assembly and longitudinally movable relative thereto, and a back mounted at the rear end of the body assembly and having means to support the roll film, roll film feeding means consisting of gearing mounted in the body assembly, and of cooperating gearing mounted in the said back and in normal meshing relation with the said gearing that is mounted in the said body assembly and means accessible exteriorly of the body assembly to separate said gearings to permit rotation of the back, the said back being, upon such separation of said gearings, manually rotatable with respect to said body assembly without interfering with the relation of the roll film feed to the other functioning parts of the camera, but permitting feeding of the film at any operating position of the rotatable back, said cooperating gearing including a ring gear upon the body assembly and a spur gear upon the rotatable back, and there being a knob-like retracting member to disengage said spur gear from driving relation to said ring gear, but holding the roll film feed means still while the said back is manually rotated to another operating position.

3. A photographic camera of the roll-film type having a body assembly and a back mounted at the rear end of the body assembly and having means to support the roll film, roll film feeding means consisting of gearing mounted in the body assembly and of cooperating gearing mounted in the said back and in normal meshing relation with the said gearing that is mounted in the said body assembly, and means accessible exteriorly of the body assembly to separate said gearings to permit rotation of the back, the said back being, upon separation of said gearings, manually rotatable with respect to said body assembly without interfering with the relation of the roll film feed to the other functioning parts of the camera, but permitting feeding of the film at any operating position of the rotatable back.

4. A roll-film camera having an operating knob upon the camera body for advancing the film, a rotatable back, a rotatable film holding mechanism in said back, a gear train for connecting the operating knob to the film holding mechanism, said gear train including a ring gear carried by the back and having its axis in common with the axis of revolution of the back, and means for disengaging the gear train at the ring gear to permit rotation of the back.

5. A roll-film camera having gear means for advancing the film, located in part, at least, in the body portion of the camera and including at least two normally inter-engaging movement-transmitting members that are disengageable from each other, a rotatable back, film holding means in said back, and means exteriorly accessible to the user and operatively connected to one of said inter-engaging movement-transmitting members whereby the said inter-engaging members may be readily disengaged at said members by the user prior to rotating the back and may be readily re-engaged by him after rotation of said back, thereby permitting rotational movement of the back without interfering with the advancing of the film by said gear means.

6. A roll-film camera in accordance with claim 5, but wherein the means for disengaging and re-engaging the inter-engaging movement-transmitting members of the said gear means for advancing the film comprises a retracting knob mounted on the outside of the camera, and a retracting arm moved by said knob, which is operatively connected to the gear means for advancing the film, whereby movement of said knob disengages said movement-transmitting members of the gear means for advancing the film.

7. A roll-film camera having a body provided with a lens and shutter and having a back member rotatably mounted upon the rear end of the body, said back member having an exposure opening, and also having means for supporting a film and gear means, partly in said back and partly in said body, for advancing a film for exposure, said gear means for advancing a film for exposure including two normally inter-engaging movement-transmitting members that are disengageable from each other, and that may be disengaged to permit manual rotative movement of said back member relative to said body, into a position at an angle to its former position and that may be re-engaged at the termination of such rotational movement, without interfering with the capacity of the camera to take pictures upon the film with the back member in either its position occupied just prior to such gear disengagement or in its position occupied upon such gear re-engagement whereby pictures may be taken upon the same film at two different angular positions, at least, of said back member, without change in the position of said camera body, and means to disengage said two members that are disengageable from each other.

8. A roll-film camera having a body with lens and shutter and a rotatable back mounted thereon, said rotatable back including a plate with an exposure opening, said rotatable back having a film carrier, film advancing means at least partly in said rotatable back, a film advancing knob upon said body, film driving gearing operatively connecting the said knob and the said film advancing means, means for connecting or disconnecting the said back sufficiently from the camera body for the purpose of effecting the manual rotation of said back with respect to the camera body, and means for connecting said film driving gearing to the film advancing means, said latter means being disengageable for rotation of the said back and re-engageable upon the completion of the rotative movement of said back.

9. A roll-film camera having a body with lens and shutter and a rotatable back mounted upon the camera body, said rotatable back including a plate having an exposure opening therein, said rotatable back also having film supporting means, film advancing means including an operating knob upon the camera body, and including disengageable gearing that itself includes two normally inter-engaging movement-transmitting members, one of which is in the body and the other in the back, that are disengageable from each other, means whereby the said plate of the said rotatable back may be held in locked position but may be manually rotated upon manual disengagement thereof from locked position, the said normally inter-engaging movement-transmitting members of said gearing being disengageable for permitting the turning of said plate and being re-engageable upon the termination of the turning movement of said plate, whereby the camera may be used with said plate in its said position prior to said turning movement or can be used in its position occupied upon completion of its said turning movement.

10. A roll-film camera having a body and a rotatable back mounted upon said body and having means for holding a film therein, gear means mounted partly in said rotatable back and partly in said body for advancing the film held in said back, said film advancing gear means including at least two normally inter-engaging movement-transmitting members that are disengageable from each other, and means carried by the camera and exteriorly accessible to the user for effecting disengagement of said movement-transmitting members from each other and for permitting the effecting upon such disengagement, both rotation of said back and disengagement of said back prior to such rotation, and also for permitting the effecting of reengagement of said back with respect to the body of the camera after such rotation, without interfering with the advance of the film.

11. A roll-film camera having a body and a rotatable back, mounted upon said body, gear means partly in the camera body and partly in the rotatable back for advancing the film, such gear means including at least two normally inter-engaging, movement-transmitting members, disengageable from each other, film holding means in said back, and means carried by the camera and exteriorly accessible to the user for effecting disengagement of said movement-transmitting members from each other, and for permitting the effecting upon such disengagement, both rotation of said back and disengagement of said back prior to such rotation, and also for permitting the effecting of re-engagement of said back with respect to the body of the camera after such rotation, without interfering with the advance of the film.

12. A roll-film camera in accordance with claim 11, wherein said members of such gear means are disengageable and re-engageable without such disengagement and re-engagement interfering with the advancing of the film.

13. A reflex roll-film camera in accordance with claim 5, wherein the means for disengaging and re-engaging the said inter-engaging members of the gear means for advancing the film at such normally inter-engaging members, comprises a retarding knob mounted upon the outside of the camera, a retarding arm connected to and moved by said arm and a flanged member engaged by said arm and itself connected to the gear means for advancing the film, whereby movement of said knob disengages the gear means for advancing the film at such normally inter-engaging members.

14. A reflex roll-film camera in accordance with claim 5, wherein the means for disengaging and re-engaging the inter-engaging members of the gear means for advancing the film, comprises a retarding knob mounted upon the outside of the camera, a retarding arm connected to and moved by said arm, and a flanged member engaged by said arm and itself connected to the gear means for advancing the film, whereby movement of said knob disengages the inter-engaging members of the gear means for advancing the film, and a spring tending to maintain the inter-engaging members of said gear means in film feed advancing position.

15. A reflex roll-film camera having a body portion and having partly in said body portion gear means for advancing the film, a rotatable back, mounted upon said body portion and also having a part of said gear means, film holding means in said back said gear means including at least two movement-transmitting normally inter-engaging members, and means exteriorly accessible to the user whereby the said two movement-transmitting, normally inter-engaging members of the said gear means for advancing the film may be readily disengaged from each other by the user prior to rotating the back and may be readily re-engaged at said two members by him upon rotation of said back, thereby permitting rotational movement of the back without interfering with the advancing of the film.

16. A photographic camera of the roll-film type having a body assembly, a lens assembly at the forward end of the body assembly, and a back mounted at the rear end of the body assembly and having means to support the roll film, roll film feeding means consisting of gearing mounted in the body assembly and also including cooperating gearing mounted in the said back and in normal meshing relation with the said film feeding means that is mounted in the said body assembly, and means accessible exteriorly of the body assembly to separate said gearings to permit rotation of the back, the said back being, upon such separation of said gearings, manually rotatable with respect to said body assembly without interfering with the relation of the film feed to the other functioning parts of the camera, but permitting feeding of the film at any operating position of the rotatable back.

17. A photographic camera in accordance with claim 16, wherein the said gearing mounted in the body assembly includes a ring gear and the gear driven thereby, and wherein the said gearing mounted in the said back includes a gear driven from the said ring gear through the said gearing in the body assembly that is driven by the said ring gear.

18. A photographic camera in accordance with claim 16, wherein the rotatable back is provided with a film housing hinged thereto, and adapted to receive therein a film roll, a take-up spool and a pressure plate.

19. A photographic camera in accordance with claim 16, wherein there is provided a retracting knob, a retracting arm, a ring gear on the body assembly, a spur gear in the rotatable back and caused to be moved by said retracting arm, and wherein there is a pin and a cooperating indexing formation respectively carried by the body assembly and the rotatable back, whereby upon movement of the retracting knob, the retracting arm causes the spur gear to be moved out of driving relation to the ring gear and the pin and indexing formation are separated, so that the rotatable back may be moved to another operating position and the said parts will become reengaged in such other operating position.

20. A roll-film camera having a body assembly, film advancing means mounted partly in said body assembly, a single operating means upon the exterior of the body assembly for turning said film advancing means, a back that is rotatable upon the camera body assembly from one operating position to another operating position and having a part of the film advancing means therein, film holding means in said back, gear means connecting said operating means to said film advancing means for advance of the film, said gear means including two inter-engaging, movement-transmitting members that are disengageable from each other, and means whereby the said two inter-engaging, movement-transmitting members of the said gear means may be disengaged and re-engaged incidental to the manual rotation of said back, and whereby film may be wound with the back in either position.

21. A roll-film camera having upon the camera body an operating knob for advancing the film, a rotatable back mounted upon said camera body, film advancing means located partly in said back, a gear train for connecting the said operating knob upon the camera body to said portion of the film advancing means that is in said rotatable back, such gear train including a ring gear carried by the said back and having its axis in common with the axis of revolution of the said back, and also including a gear journaled in said body and meshing with said ring gear, and means for disengaging such gear that meshes with said ring gear, from its engagement with said ring gear, to permit rotation of the said back without thereby advancing the film.

22. A roll film camera having a body with an exposure opening, and having a back rotatably mounted upon said body, and having a co-operating exposure opening, film holding means mounted in said back, film transport means mounted partly in said back and including a gear mounted in said back, and including as a part of said film transport means a gear that is mounted in said body, and means mounted exteriorly of the camera and readily accessible to the user and that is operatively connected to the said gear that is mounted in the body portion of the camera, for the purpose of disengaging said gear mounted in the body portion of the camera from the gear mounted in the said back, whereby the said gear mounted in the body may be readily disengaged from the gear mounted in said back by the user prior to rotating the back, and then readily reengaged by him after desired rotation of said back whereby the disengagement of said gear prevents film transporting movement from being made, and the reengagement again permits film transporting movement to be made.

23. A roll film camera having a body portion, a back rotatably mounted upon said body portion, and having therein film supporting means and also having therein film advancing gearing, a gear mounted in said body position and in meshing relation with the film advancing gearing of said back, and means readily accessible to the user and that is operatively connected to the said gear that is mounted in the body portion of the camera, for the purpose of disengaging said gear mounted in the body portion of the camera from the gearing mounted in the said back for disconnecting said gear in the body portion from driving relation with the film advancing gearing of said back, so that the back may be rotated to permit the taking of pictures in different positions without changing the position of the body portion of the camera.

24. A roll film camera in accordance with claim 23, wherein the body portion and the back have engaging walls upon which they are relatively rotatable.

25. A roll film camera in accordance with claim 23, wherein the body portion and the back have engaging walls upon which they are relatively rotatable, the said wall of the body portion having a large circular aperture with a marginal bearing surface and the said wall of the back having an aperture plate rotatably positioned and supported within said bearing surface.

26. A roll film camera in accordance with claim 23, wherein the body portion and the back have engaging walls upon which they are relatively rotatable, the said wall of the body portion having a large circular aperture with a marginal bearing surface and the said wall of the back having an aperture plate rotatably positioned and supported within said bearing surface, the said aperture plate of said back having secured thereto a washer-like plate with an encircling bearing channel, a freely rotatable ring gear mounted in said bearing channel, and a film transport spur gear in said body portion meshing with said ring gear, said ring gear and said spur gear each constituting a part of the said film advancing gear.

27. A roll film camera in accordance with claim 23, wherein the body portion and the back have engaging walls upon which they are relatively rotatable, the said wall of the body portion having a large circular aperture with a marginal bearing surface and the said wall of the back having an aperture plate rotatably positioned and supported within said bearing surface, the said aperture plate of said back having secured thereto a washer-like plate with an encircling bearing channel, a freely rotatable ring gear mounted in said bearing channel, and a film transport spur gear in said body portion, meshing with said ring gear, said ring gear and said spur gear each constituting a part of the said film advancing gear, the said aperture plate having therein a plurality of indexing holes spaced apart in a circumferential direction, a retractable pin in said body portion and engageable with said indexing holes respectively for holding said body portion and said back in desired position with respect to each other, and means readily accessible to the user of the camera and operatively connected to said retractable pin, thereby to manipulate said pin for locking the back in any selected position to which it may be turned.

ROLLIN W. KING.
EMMANUEL BERLANT.

References Cited in the file of this patent

UNITED STATES PATENTS

| Number | Name | Date |
| --- | --- | --- |
| 1,060,748 | Folmer | May 6, 1913 |
| 2,439,112 | Teague | Apr. 6, 1948 |

FOREIGN PATENTS

| Number | Country | Date |
| --- | --- | --- |
| 705,755 | Germany | May 8, 1941 |